United States Patent [19]

Dalke

[11] 4,219,763
[45] Aug. 26, 1980

[54] RADIAL SWEEP GENERATOR CIRCUIT

[75] Inventor: James Dalke, Bellevue, Wash.

[73] Assignee: Arvin Industries, Inc., Columbus, Ind.

[21] Appl. No.: 933,428

[22] Filed: Aug. 14, 1978

[51] Int. Cl.² ............................................. H01J 29/78
[52] U.S. Cl. .................................... 315/378; 340/752
[58] Field of Search ................ 315/378; 340/752, 766, 340/768, 782; 58/50 R

[56] References Cited

U.S. PATENT DOCUMENTS

| 3,978,480 | 8/1976 | Tsuruta et al. | 315/378 |
| 4,041,692 | 8/1977 | Marshino | 58/50 R |
| 4,138,626 | 2/1979 | Unotoro et al. | 58/50 R |

Primary Examiner—Theodore M. Blum

Attorney, Agent, or Firm—Biebel, French & Nauman

[57] ABSTRACT

A radial sweep generator circuit generates a series of radial sweep lines in succession to simulate a rotating sweep line which extends from the center of a video display to the periphery of the display. The display consists of a rectangular matrix of display positions arranged in lines and columns which are scanned in a raster scanning format. A vector number generator generates a vector number signal corresponding to one of the radial sweep lines which is to be displayed. A vector origin counter determines the display position on the periphery of the matrix from which the sweep line is to originate. A vector line generator is responsive to the vector number generator and to the vector origin counter for providing video display pulses.

5 Claims, 15 Drawing Figures

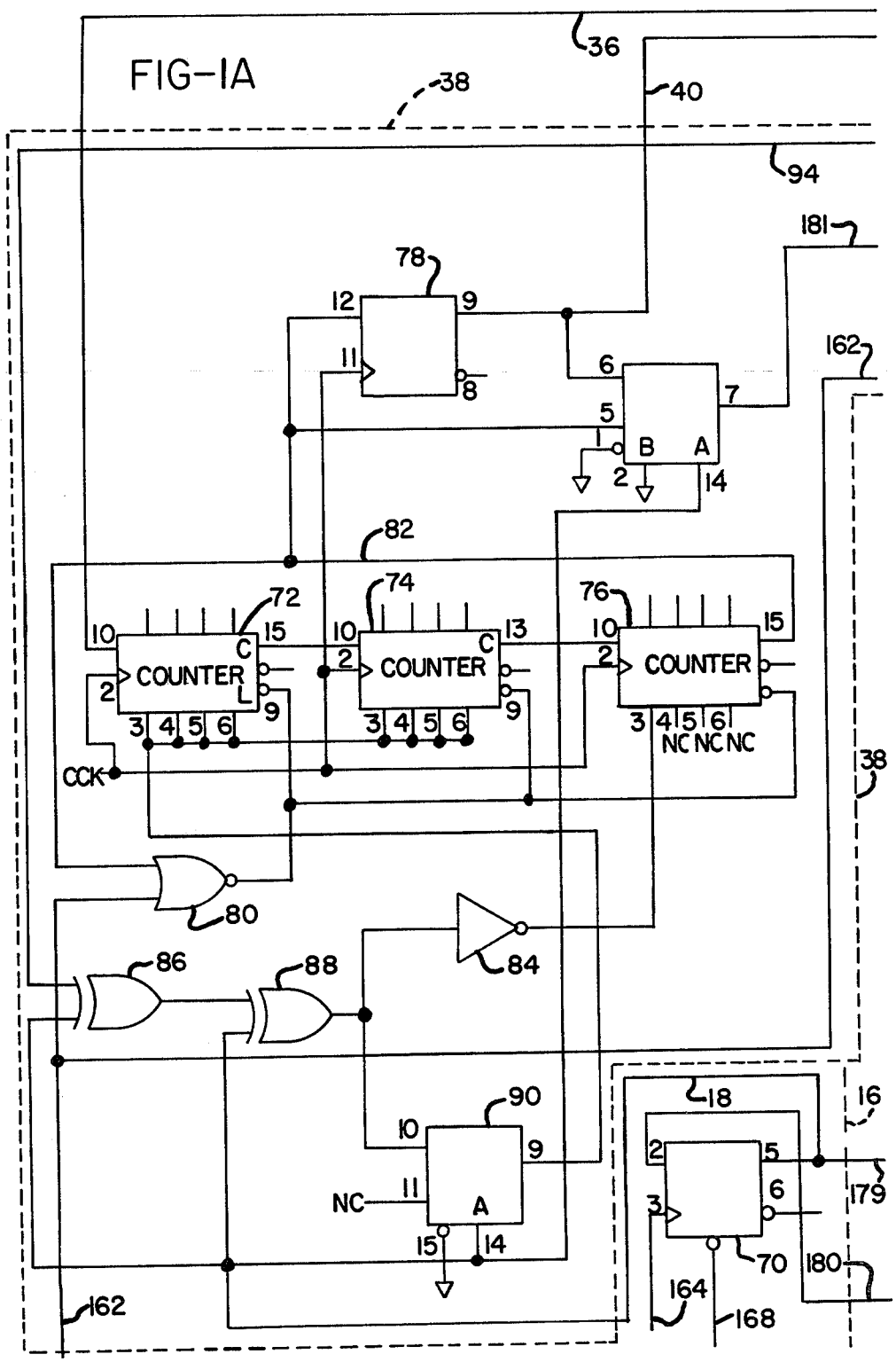
FIG-IA

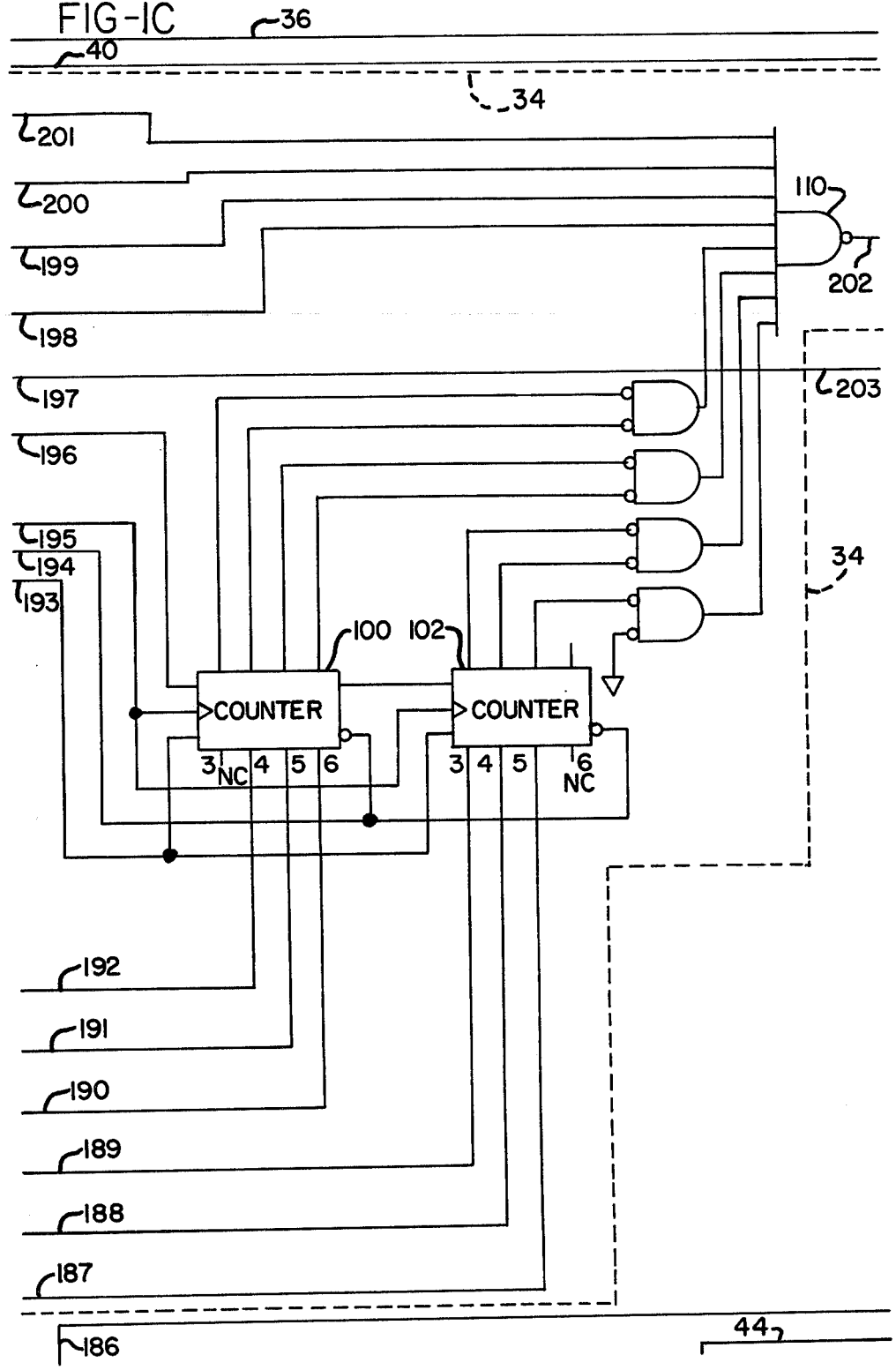

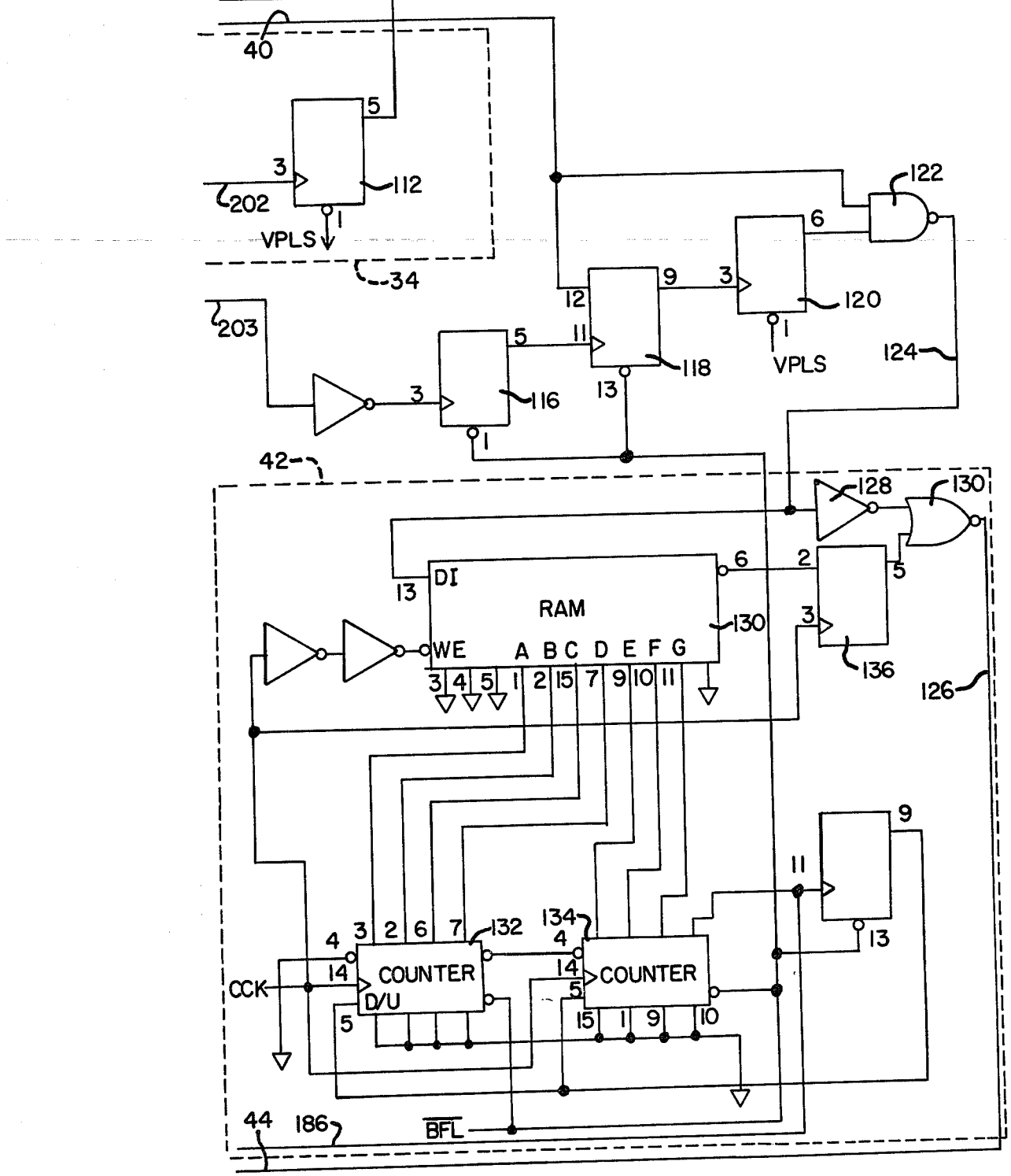
FIG-ID

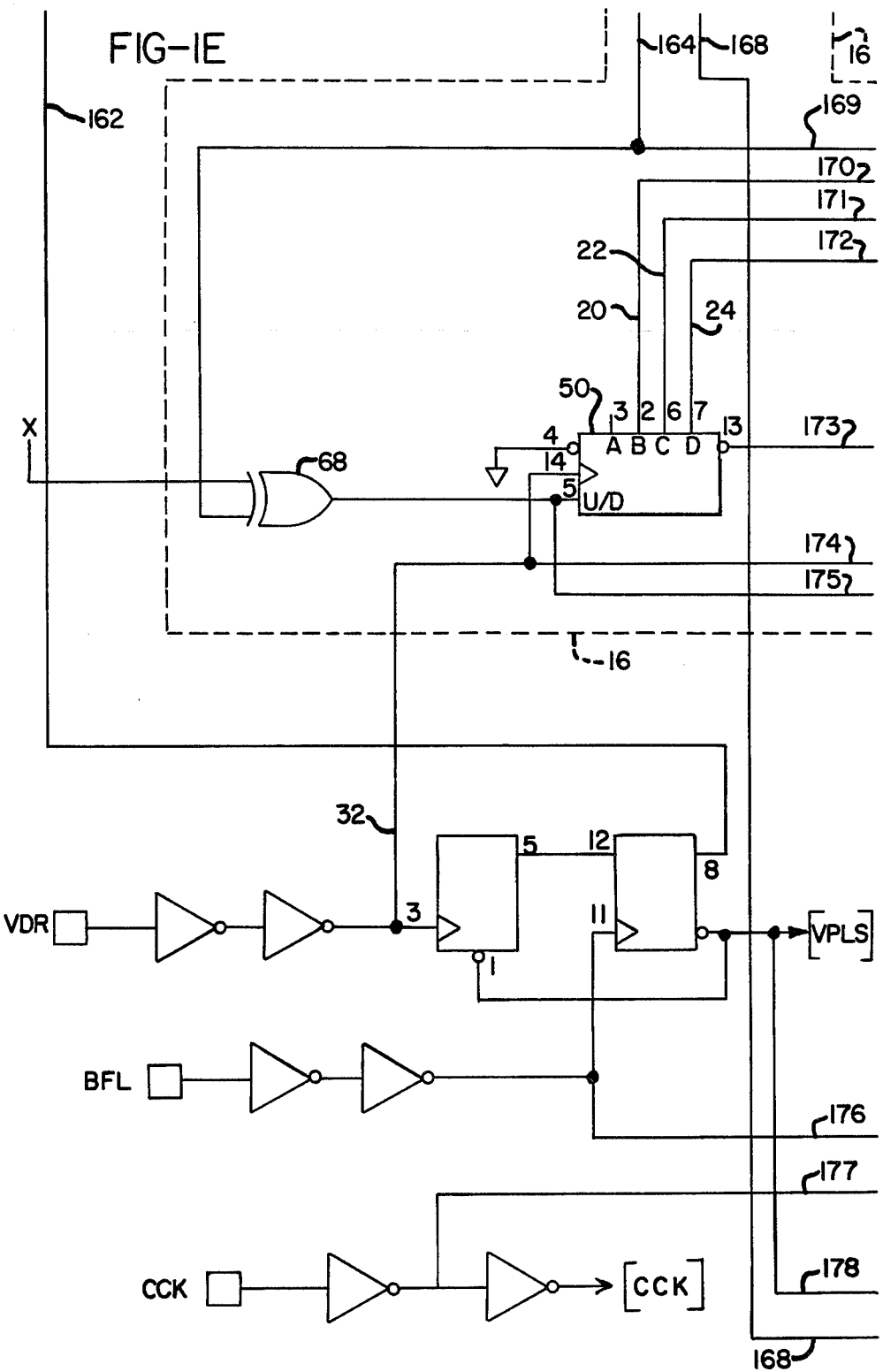

RADIAL SWEEP GENERATOR CIRCUIT

BACKGROUND OF THE INVENTION

The present invention relates to a video signal generator and, more particularly, to a circuit for successively generating a series of radial sweep lines which simulate a rotating sweep line of the type characteristic of many video radar displays.

The Weather Service has a number of weather radar stations throughout the United States, each presenting a radar picture which is transformed from rho-theta to direct linear raster scan display by a vidicon camera. Essentially, this is done by focusing the camera on the display tube of a radar unit. A transparent overlay is provided on the weather radar tube which provides an outline of a map of topological features, such as shore lines, and state boundaries, with range circles which correspond to the range at which the radar device is operated. This overlay also provides a surface for notes made by the meteorologists operating the radar unit.

The radar picture is transmitted over 3 KHz bandwith telephone lines at a rate of one frame every one hundred seconds, and is intended to be displayed on a storage tube at the receiving location, or to be reproduced by a facsimile machine operating at eight lines per second. The single frame of low frequency picture information is thus comprised of eight hundred lines of video information, together with horizontal sync components which indicate the end of each line, and a vertical sync component which identifies the end of the frame.

There is substantial demand for current weather information by the public through television broadcasting stations, or through television cable systems. The use of a facsimile type picture signal, however, is an impediment to full utilization of this weather radar information, since this type of facsimile receiving equipment is often not as convenient to use. It is much more convenient to display the weather radar picture with an ordinary television monitor.

In order to convert the available facsimile picture to a standard video display signal, a converter, disclosed in U.S. Patent Application Ser. No. 897,281, filed Apr. 17, 1978, by James Dalke, and assigned to the assignee of the present invention, has been developed. In this converter, one frame at a time is converted into digital signals. The digitally converted video signals are stored in a random access memory in a 256×256 matrix format, ultimately providing the picture at a 1:1 aspect ratio. The memory is then read out at a higher speed, synchronized to provide broadcast compatible television signals. The output is converted to an analog signal, appropriate level adjustment is made, and color is added to the video display.

It has been felt that the stationary picture displayed on the television receiver lacks dynamic interest. In order to introduce action into the picture, the above noted application disclosed a sweep generator which provides a rotating sweep line video signal which is added to the displayed video radar picture. This sweep line is superimposed on the radar display purely for ascetic purposes and does not relate to the actual sweep of the weather radar unit producing the picture.

The approach taken in the above referenced Dalke application to generate the rotating sweep line video is to provide a rotating disc having a sweep line marked thereon. A conventional vidicon camera monitors the rotating disc to produce a rotating sweep line video output. This video output is then added to the static picture produced by the video converter. Such a sweep line generator is both bulky in size and expensive.

Accordingly, it is seen that there is a need for a less expensive solid state sweep line function generator, capable of producing a video representation of a sweep line.

SUMMARY OF THE INVENTION

A radial sweep generator circuit for generating a series of radial sweep lines in succession to simulate a rotating sweep line which extends from the center of a video display to the periphery of the display and which rotates about the center of the display is provided. The display consists of a rectangular matrix of display positions arranged in lines and columns which are scanned in a raster scanning format in synchronization with a clock pulse train. A vector number generator means for generating a vector number signal corresponding to one of the series of radial sweep lines which is to be displayed is provided. A vector origin counter means is responsive to the clock pulse train and to the vector number generator means and provides an origin signal as the origin matrix position on the periphery of the matrix display from which the sweep line is to emanate is scanned. A vector line generator means is responsive to the vector number generator means and to the vector origin counter means and provides video display pulses as selected display positions are scanned such that a sweep line emanating from the vector origin matrix position and passing through the center of the matrix of display positions may be displayed.

The radial sweep generator circuit further comprises a mirror memory means which is responsive to the video display pulses from the vector line generating means for generating a series of mirror image display pulses appropriately timed to form a mirror image of the simulated sweep line in the horizontally adjacent quadrant. The radial sweep generator further includes quadrant blanking means, responsive to the mirror memory means and to the vector line generator means, for providing a final video output signal for displaying a sweep line in only one quadrant of the display matrix at a time.

The vector line generator means comprises a counter means which is presettable to a plurality of counts for providing a video display pulse upon receipt of a predetermined number of clock pulses. The vector line generator means also comprises means for selecting the predetermined count to which the counter means is set in response to the vector number signal from the vector number generator means.

The matrix of display positions is scanned repetitively in synchronism with vertical interval pulses. The vector number generator means may comprise vector number counter means, responsive to the vertical interval pulses for providing successive vector number signals, each associated with a respective one of the series of radial sweep lines.

Accordingly, it is an object of the present invention to provide a sweep line function generator in which a video output, simulating a rotating sweep line, is generated by digital techniques; to provide such a function generator in which a series of appropriately timed pulses are provided to a video signal output, which pulses collectively form a sweep line of desired position and orientation; and to provide a series of such sweep lines which, when successively displayed, simulate a rotating sweep line.

Brief Description of the Drawings

FIGS. 1(A)–1(G), when assembled as shown in FIG. 2, form an electrical schematic of the circuit of the present invention;

FIG. 2 is a diagrammatic representation of the manner in which FIGS. 1(A)–1(G) are to be assembled;

Detailed Description of the Preferred Embodiment

Figure 1B:
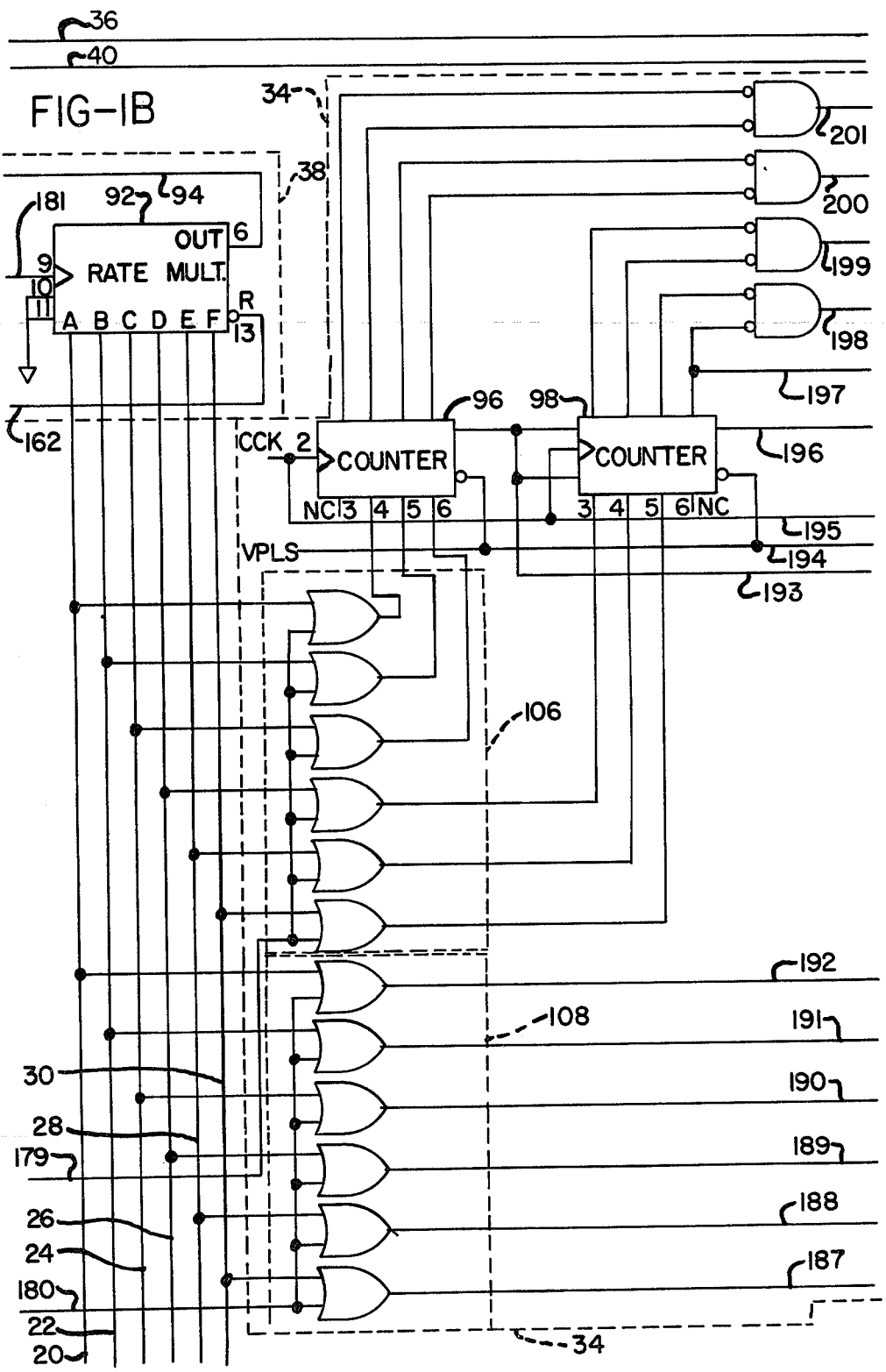
Figure 1F:
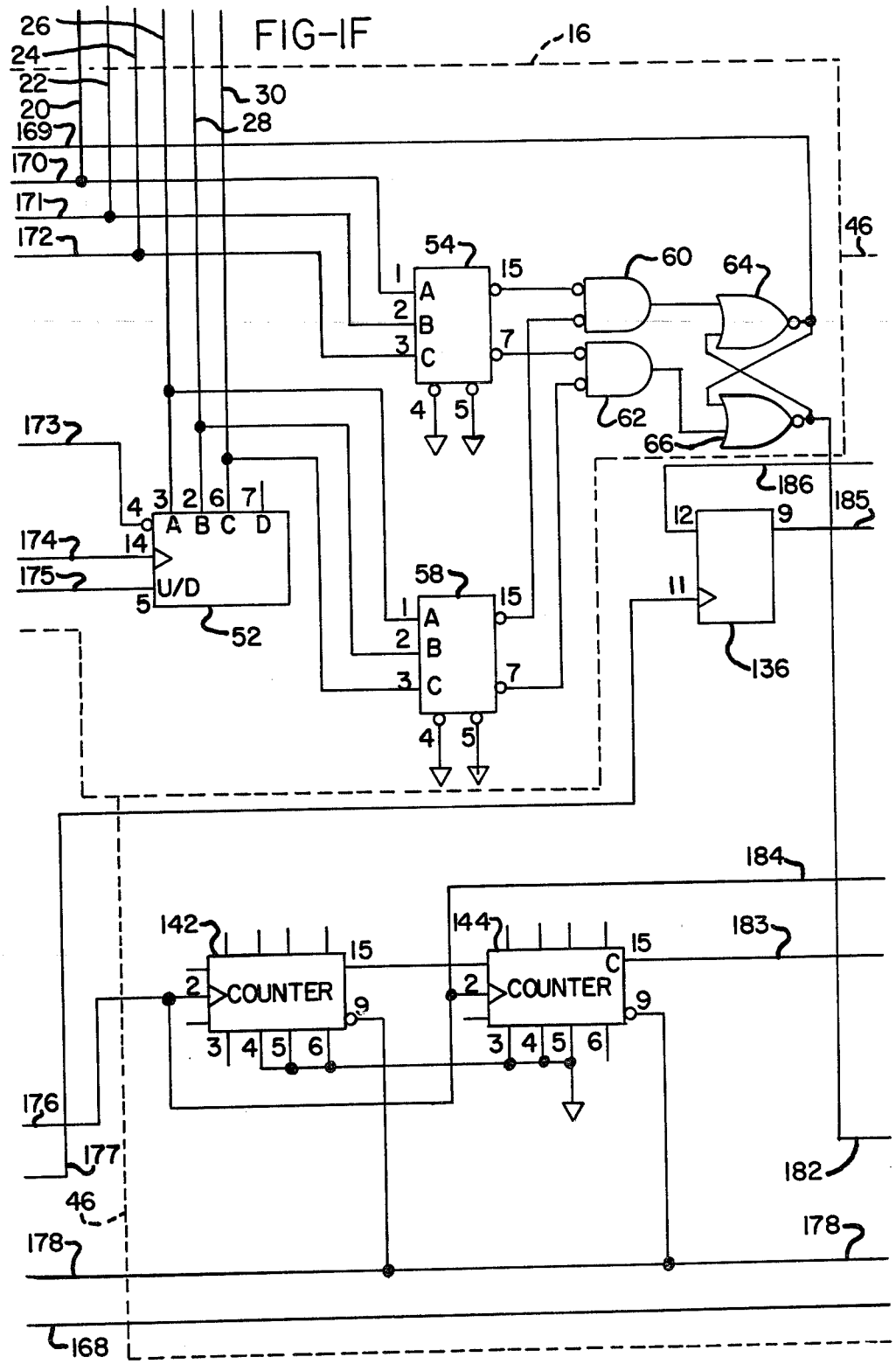
Figure 1G:
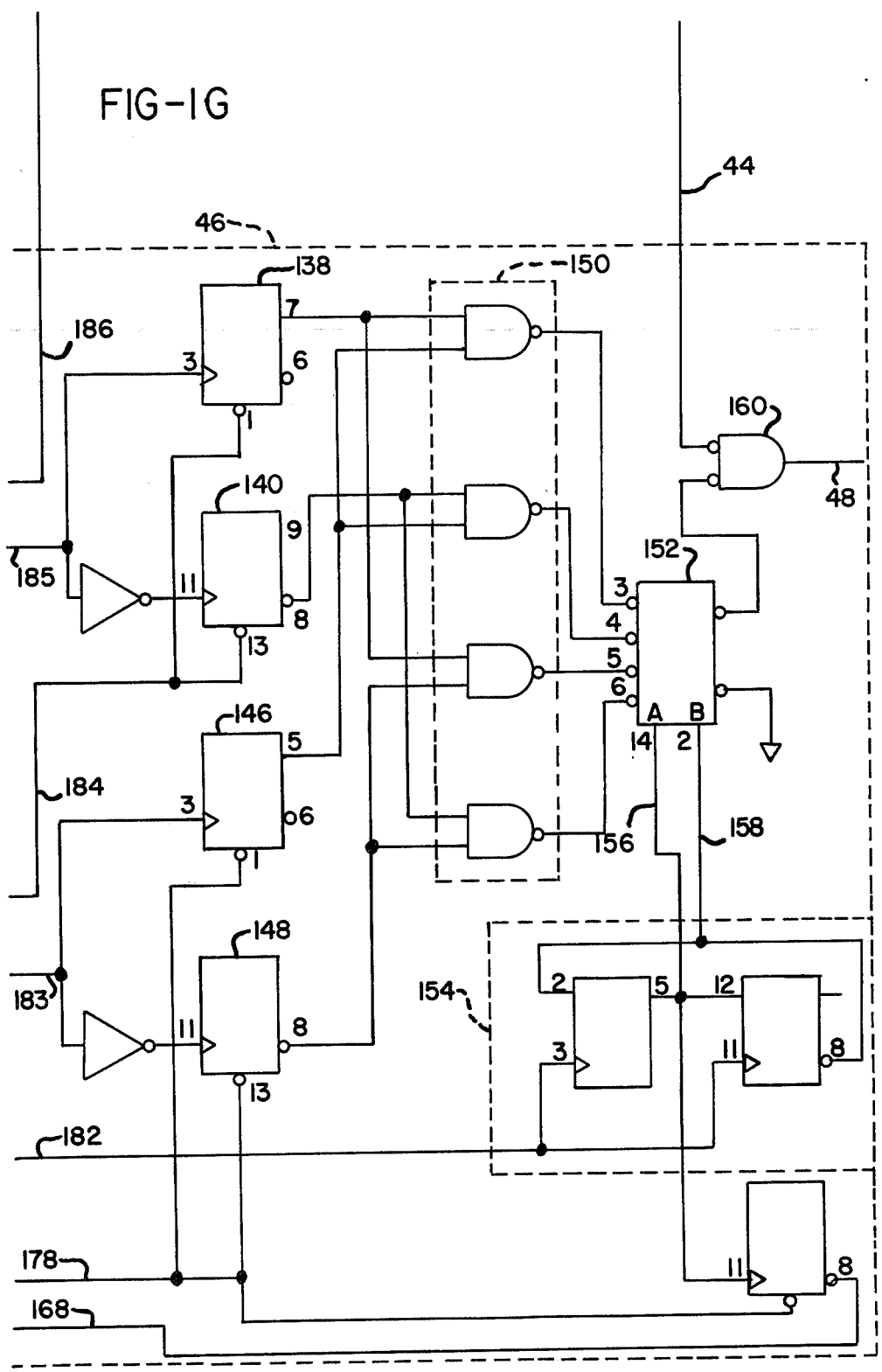
Figure 2:
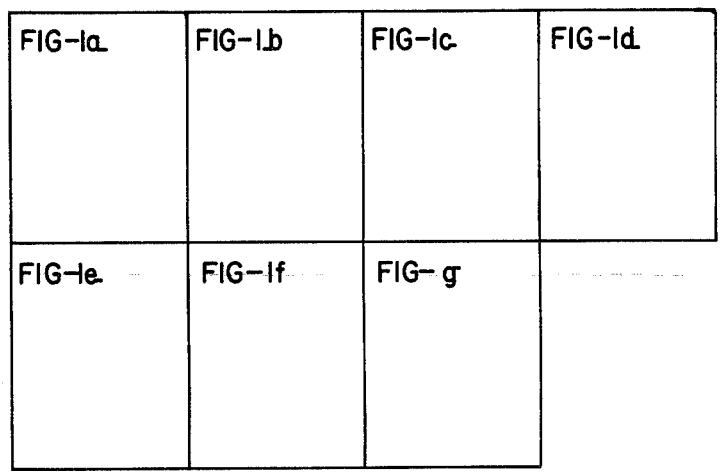

FIGS. 1(A)–1(G), when assembled as shown in FIG. 2, comprise an electrical schematic of the radial sweep generator circuit of the present invention. The sweep generator circuit generates a series of radial sweep lines in succession to simulate a rotating sweep line, which line extends from the center of the video display to the periphery of the display and rotates about the center of the display. The display may typically consist of a rectangular matrix of display positions arranged in lines and columns which are repetitively scanned in a raster scanning format. Such a display arrangement is illustrated in the above referenced application to Dalke, with the rectangular matrix consisting of a matrix of 256×256 display positions.

In the context of a standard interlaced video on display, the entire matrix will be scanned at the video field (60 times per second) with successive fields of video information interlacing to form a complete video frame. The circuit of the present invention generates a series of pulses which are appropriately synchronized to the video scanning timing such that when these pulses are superimposed upon a video signal from another source, such as provided by the facsimile-to-video converter of the Dalke application, a series of dots will appear on the video monitor at selected ones of the 256×256 positions. The dots collectively will form a simulated sweep line.

The circuit of the present invention will generate a new sweep line during display of every alternate field, with the new sweep line being slightly radially offset with respect to the previously generated sweep line. The series of sweep lines thus displayed will simulate a rotating line. In the disclosed embodiment of the present invention, 128 such sweep lines will be generated in each quadrant, thus resulting in a time of rotation of approximately 17 seconds.

Figure 3:
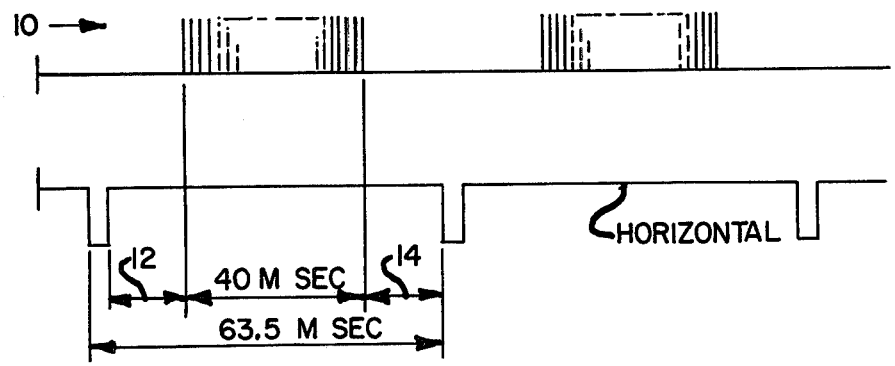
FIG. 3 is a timing diagram useful in explaining the present invention.
Figure 4:
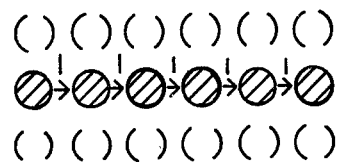
FIGS. 4–8 are matrix position diagrams illustrating the manner in which a sweep line is simulated by the circuit of the present invention.

As seen in FIG. 3, a clock pulse train 10 is provided, with each pulse in the clock pulse train occurring as a corresponding display position in the rectangular matrix is scanned. Such a pulse train (CCK) is available from the timing circuitry in the facsimile-to-video converter. Groups of 256 clock pulses occur during 40 micro-second intervals as each of the 256 horizontal display positions in one line of the matrix of display positions is scanned. These clock pulses occur approximately in the middle of each 63.5 micro-second period required for scanning a single horizontal line of video. No display from the sweep generator circuit will be generated during the times 12 and 14 and, therefore, the rectangular matrix of display positions will be positioned centrally on the video monitor, with areas extending along each vertical edge of the monitor not being used for display.

A vector number generator means 16 generates a vector number signal on lines 18–30 which corresponds to the one of the series of radial sweep lines which at that moment is to be displayed. The vector number generator means 16 is responsive to a vertical drive pulse on line 32 which occurs at the rate of one pulse per field. The vector number signal on lines 18–30 is capable of assuming any of 128 binary states, each such state defining a corresponding one of the 128 radial sweep lines which may be generated for one quadrant of the display.

A vector origin counter means 34 is responsive to the clock pulse train and to the vector number generator means and provides an origin signal on line 36 as the origin matrix position on the periphery of the matrix display from which the sweep line is to emanate is scanned, as more completely described below. Although the sweep line will in each instance pass through the center of the display, because of the raster scanning format in which the display positions are scanned (each horizontal line from left to right with the lines being scanned from the top to the bottom of the display) display of a sweep line appearing in the upper left hand quadrant of the display will be initiated at a display position on the periphery of the quadrant.

A vector line generator means 38, upon receipt of a pulse on line 36, will initiate operation and provide video display pulses on line 40 which are appropriately timed such that they will be generated as selected display positions in the matrix are scanned. A sweep line emanating from the origin matrix position and passing through the center of the matrix of display positions may be displayed. Operation of the vector line generator means 38 is controlled by the vector number signal on lines 18–30 such that a sweep line corresponding to the vector number signal and having a slope such that it passes through the origin will be generated.

The sweep line defined by pulses on line 40, if displayed in unmodified form would appear as a line extending from the upper left hand quadrant through the origin and thereafter passing through the lower right hand quadrant on the video monitor. This line would rotate counterclockwise from a vertical position until reaching a horizontal position. The line would then rotate clockwise from the horizontal position back to a vertical position. It will be appreciated that in order to generate a sweep line having the appearance of a continuously rotating line extending from the periphery of the display and terminating at the center of the display, the pulses on line 40 will necessarily require modification.

A mirror memory means 42 receives the pulses from line 40 and generates a second series of pulses which are added to the pulses from line 40 and which define a series of sweep lines which are the mirror image of those generated by the vector line generator means 38. Thus the output of the mirror memory means 42 on line 44, if displayed without modification, would give the appearance of two sweep lines extending completely across the display through the center thereof and rotating in opposite directions.

In order to modify further the output pulses on line 44, a quadrant blanking means 46 provides only those output pulses from line 44 to line 48 which occur during the display of successive quadrants of the matrix of display positions. Thus the final video output on line 48, when supplied to a video monitor simulates a continuously rotating sweep line which extends only from the origin of the display in one direction to the display periphery.

Reference is now made to FIGS. 4–8 which depict portions of a display matrix and illustrate schematically the technique employed in simulating a sweep line in the present invention. In the following discussion, a vertical sweep line will be defined as positioned at 0°. The angle of an inclined sweep line will be measured counterclockwise from vertical. A 90° sweep line will therefore extend horizontally to the left of vertical.

Th display positions in the 256×256 matrix array, scanned left to right and top to bottom, may be counted during the sweep line generation process. Specifically, a sweep line may be generated by counting the number of display positions scanned between sweep line pulses and generating successive pulses accordingly. In order to generate a horizontal line (90°), the display positions are counted with a video display pulse being generated after each display position is counted. This is illustrated diagrammatically in FIG. 4.

Figure 5:
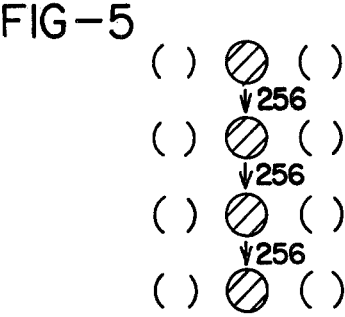
Figure 6:
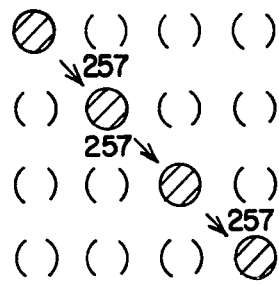

To generate a vertical line (0°), 256 display positions are counted between each display pulse, as shown in FIG. 5. For an angular line at 45°, 257 display positions are counted between each sweep line pulse, as shown in FIG. 6. Any angle between 0° and 90° may be approximated by assembling segments of these three basic lines.

Figure 7:
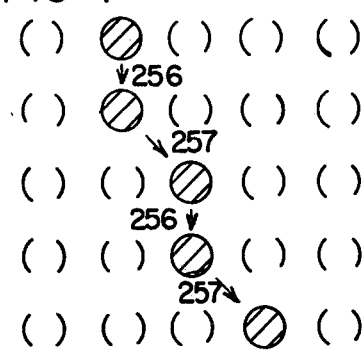
Figure 8:
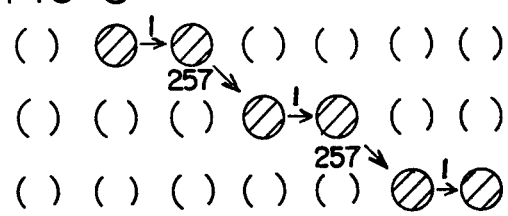

For example, a vector at 26° may be approximated by assembling the count sequence 256, 257, 256, 257, . . . as shown in FIG. 7. Using the angle convention noted above, the angle will be the cotangent of the horizontal dot displacement divided by the vertical dot displacement. Thus, in FIG. 7, COT $\theta = 3/6$. Therefore, $\theta$ equals 26.6°. Similarly, an angle of 63° may be approximated, as shown in FIG. 8, by assembling the counts sequence 1, 257, 1, 257, . . . Thus as seen in FIG. 8, COT $\theta = 6/3$. Therefore, $\theta = 63°$.

As shown in FIG. 1, the vector number generator means 16 includes a vector number counter means consisting of counters 50 and 52. These counters consist of type SN74IS191 counters. Counters 50 and 52 are connected in tandem to count the pulses received from line 32. Since the least significant count output of counter 50 is not utilized, the count state applied to lines 20–30 will change only on alternate fields. Thus an incremented or decremented vector number signal will be applied to these lines once each video frame.

Decoders 54 and 58, type SN74LS138, gates 60 and 62, and a flip flop formed of NOR gates 64 and 66, provide a circuit which controls the direction of count of counters 50 and 52 via EXCLUSIVE OR gate 68. Gate 68 has a "1" signal applied to pin 10 and thus acts as an inverter. As so connected, counters 50 and 52 will count from zero up to sixty-three. At this point, the direction of count will be reversed and the counters will then count down to zero. Sector flip flop 70 is responsive to the output of the flip flop formed by gates 64 and 66 such that flip flop 70 will change state each time the counters 50 and 52 reach a count of 63. Sector flip flop 70 thus effectively provides a most significant bit output on line 18, termed the sector count, which, in conjunction with the outputs on lines 20–30, defines the 128 possible sweep lines which may be generated in a quadrant. The operation of the vector number generator means 16 is diagrammatically illustrated in FIG. 9.

The vector line generator means 38 includes counters 72, 74, and 76, type SN54161, which are presettable on their pin inputs 3, 4, 5, and 6, to a plurality of counts. These counters provide a video display pulse to line 40 via flip flop 78 upon receipt of a predetermined number of clock pulses. The balance of the circuit 38 provides a means for selecting the predetermined count to which the counters 72–76 are set. This predetermined count is chosen in response to the vector number signal on lines 18 –30, from the vector number generator means 16. Counters 72, 74, and 76 are connected in tandem and are repetitively loaded with selected predetermined counts by supplying the inverted carry from counter 76 to the counter load inputs via NOR gate 80.

The binary number which is loaded into the counters 72, 74 and 76 is selected as 4096 minus the number of successive display positions which are to be counted between successive video display pulses. Thus by loading the binary number 4095 into counters 72, 74, and 76, the counters will provide an output pulse to line 82 for each input clock pulse. A sweep line at an angle of 90° will therefore be generated. If the binary number 3840 is loaded into the counters 72, 74, and 76, an output pulse will be applied to line 82 after receipt of 256 input clock pulses, generating a sweep line at 0°. If the binary number 3839 is loaded into the counters 72, 74, and 76, 257 display positions will be counted between output pulses on line 82 and, therefore, a diagonal sweep line at an angle of 45° will be generated.

Gates 80, 84, 86, 88, and data selector 90 type SN54153, control loading the binary numbers 4095 (111111111111), 3840 (111100000000), and 3839 (111011111111). Counter 76 receives the most significant bits while counter 72 receives the least significant bits. By causing the counters to count selectively 256 and 257 display positions, any sweep line between zero degrees and 45° may be generated. Similarly by causing the counter to count selectively 257 and 1 display positions, any sweep line between 45° and 90° may be generated.

In order to control selectively alternating between 256 and 257 counts and between 257 and 1 counts, a binary rate multiplier 92, type SN7497, is provided. Multiplier 92 controls loading of the counter 72, 74, and 76 in response to the vector number signal on lines 20–30. Multiplier 92 is configured such that for each 64 clock input pulses on pin 9, the number of output pulses applied to line 94 will equal the binary number provided at its inputs A–F, with F being the most significant bit and A being the least significant bit.

Figure 9:
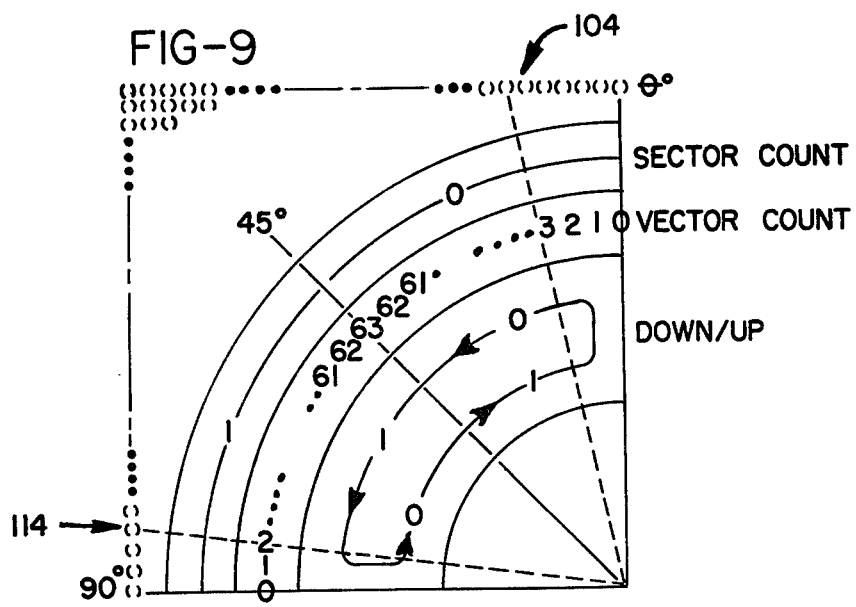
FIG. 9 is a diagrammatic representation of one quadrant of the video display, useful in explaining the present invention.

If, for example, inputs A–F were to receive 000001, respectively, 32 output pulses would be supplied to line 94 for every 64 input pulses applied to the multiplier 92. If the sector count is 0, indicating the sweep line between 0° and 45° as shown in FIG. 9, the circuitry would provide 32 counts of 256 alternating with 32 counts of 257 to produce a sweep line with an angle of 26°.

If, on the other hand, the vector number signal is a binary 4, four output pulses from the multiplier 92 will be provided for every 64 input pulses. Therefore, if the sector count is 0, indicating an angle between 0° and 45°, there will be a sequence of 4 counts of 257 regularly interspaced with 60 counts of 256. It should be noted that COT $\theta = 64/4$. Therefore, $\theta = 3.6°$. In general, when $\theta$ is between 0° and 45°, $\theta$ will equal $COT^{-1}$ (64/N), where N equals the binary number supplied to inputs A–F of multiplier 92.

If the binary number supplied to inputs A–F of multiplier 92 equal binary 61, and the sector count state is 0, indicating an angle between 0° and 45°, then 3 counts of 256 will be regularly interspersed with 61 counts of 257. $\theta$ will therefore equal $COT^{-1}$ (64/61)=43.6°.

Alternatively, if the sector count state is 1, indicating that $\theta$ lies between 45° and 90°, the counts will alternate between 1 and 257. If the multiplier 92 receives a binary input of 57 from the vector number generator means 16, 7 counts of 1 will be regularly interspersed with 57 counts of 257. Thus $\theta$ will equal $TAN^{-1}$ 64/N=48.3°.

When the sector count is 1, selector 90 will always provide a "1" to pins 3, 4, 5, and 6 of counters 72 and 74. A pulse on line 82 will, therefore, affect only the pin 3 input of counter 76, thus causing a 1 count, binary number 4095 (111111111111), to be loaded into the counters, or a 257 count condition, binary number 3839 (111011111111), to be loaded into the counters. Similarly, a zero-count state will cause selector 90 to apply to its output pin 9 the same logic level applied to its input pin 10. This will result in either 256 clock pulses being counted or 257 clock pulses being counted, in dependence upon the signal on line 94.

As discussed above, the sweep line will originate at a matrix position on the periphery of the matrix in the upper left hand quadrant. Thus such a line will originate at one of the first 128 display positions in the uppermost line of display positions or at the first display position in one of the first 128 lines. In order to time initiation of the sweep line generation properly, the vector origin counter means 34 includes counters 96, 98, 100 and 102 which are connected in tandem to count clock pulses.

When the origin matrix position is in the top line of positions, as seen in FIG. 9, such as at position 104, counters 96 and 98 will be loaded with the vector count via gates 106. Selector flip flop 70 will cause all "1's" to be loaded into counters 100 and 102 via gates 108. The vector count number, therefore, determines how quickly the counters 96, 98, 100, and 102 will be counted up such that all counter outputs equal "zero." When this occurs during scanning of the first line of the display positions, gate 110 will provide an output to line 36 via flip flop 112, indicating that the origin matrix position for generation of the sweep line has been reached and causing the vector line generator means 38 to begin operation.

Alternatively, when the origin matrix position required for generation of a sweep line is the first such positions in one of the lower lines of display positions, such as position 114, the counters 96 and 98 will be loaded with all "1's" and the counters 100 and 102 will receive the vector number signal via gates 108. After the appropriate number of display lines have been scanned, the counters 96–102 will have counted up to a count state in which all outputs are "zero" and a pulse will be applied to line 36. It should be noted that the least significant predetermined count load input of counters 96 and 100 are always loaded with "1's" with the vector number signals applied to the higher order load inputs. This is done so that a pulse will be applied to line 36 only as alternate display positions around the quadrant periphery are scanned since there are 128 possible sweep lines, but 256 display positions on the periphery.

The video display pulses on line 40 are supplied to mirror memory means 42 via flip flops 116, 118, and 120 and gate 122. Gate 122 and flip flops 116–120 will provide the video display pulses to line 124 until the right hand vertical edge of the display matrix is reached, at which time gate 122 will be disabled.

The mirror memory means 142 will pass the video display pulses from line 124 to line 126 via inverter 128 and NOR gate 130. Additionally, these pulses will be applied to the input of random access memory 130. Counters 132 and 134 will count clock pulses such that the count state of the counters will cycle from 0 to 127 and then back to 0 on a repetitive basis. The count state of counters 132 and 134 controls the location in the memory 130 into which the pulses on line 124 are stored. Outputting of the pulses stored in memory 130 is accomplished under control of the clock pulse train. The output pulses from memory 130 are then supplied via flip flop 136 and added to the video display pulses on line 126. The net effect of circuit 42 is to provide a second sweep line pulse train to line 126 which is the exact mirror image of that provided on line 124. Thus if the pulses on line 124 define, for example, a sweep line which is inclined 25° from vertical extending from the upper left hand quadrant into the lower right hand quadrant, the pulses provided by the mirror memory circuit 42 will define a sweep line which is inclined 25° with respect to vertical but extending from the upper right hand quadrant into the lower left hand quadrant. Each of these sweep lines will, of course, pass through the center of the matrix of display positions. As successive mirror image sweep lines are generated, the pulses on line 126, if displayed, would give the appearance of two counter rotating lines, each extending across the entire display matrix.

The quadrant blanking means 46 is responsive to the mirror memory means 42 for providing a final video output signal on line 48 which when displayed simulates a rotating sweep line in only one quadrant of the display matrix. The output of the counters 132 and 134 is connected to a flip flop 136 which controls the states of flip flops 138 and 140. The state of flip flop 136 will be dependent upon whether the left or right half of the display matrix is being scanned. Similarly, counters 142 and 144 receive a burst flag input which occurs at the video horizontal line rate. The counters 142 and 144, connected in tandem, control the states of flip flops 146 and 148 in dependence upon whether the lower or upper half of the display matrix is being scanned.

NAND gates 150 will, therefore, supply signals to pins 3–6 of the selector 152, type SN54153. The inputs to selector 152 from NAND gates 150 will provide an indication of which quadrant of the matrix display is being scanned, with each input corresponding to one of the four quadrants of the matrix display. A ring counter 154 provides control inputs on lines 156 and 158 to selector 152. The four states of ring counter 154 correspond to the four quadrants of the matrix display. Counter 154 receives its count input from the output of gate 66 and will therefore remain in each count state as long as sweep lines in the quadrant associated with the count state are being generated. Thus the count state of counter 154 will determine which of the outputs of gates 150 is used to enable gate 160. Gate 160 will only pass final video output signal pulses to line 48 when the proper quadrant is being scanned.

While the form of apparatus herein described constitutes a preferred embodiment of the invention, it is to be understood that the invention is not limited to this precise form of apparatus, and that changes may be made therein without departing from the scope of the invention.

What is claimed is:

1. A radial sweep generator circuit for generating a series of radial sweep lines in succession to simulate a rotating sweep line which extends from the center of a video display to the periphery of the display and which rotates about the center of the display, the display consisting of a ractangular matrix of display positions arranged in lines and columns which are scanned in a raster scanning format with successive display positions being scanned in synchronization with a clock pulse train, comprising:

vector number generator means for generating a vector number signal corresponding to one of said series of radial sweep lines which is to be displayed, vector origin counter means, responsive to said clock pulse train, and to said vector number generator means, for providing an origin signal as the origin matrix position on the periphery of the matrix display from which the sweep line is to emanate is scanned, and vector line generator means, responsive to said vector number generator means and to said vector origin counter means, for providing video display pulses as selected display positions are scanned during scanning of said rectangular matrix of display positions in a raster scanning format such that a sweep line emanating from said vector origin matrix position and passing throught the center of said matrix of display positions may be displayed.

2. The radial sweep generator circuit of claim 1 further comprising mirror memory means, responsive to said video display pulses from said vector line generator means, for generating a series of mirror image display pulses appropriately timed to form a mirror image of the simulated sweep line.

3. The radial sweep generator circuit of claim 2, further comprising quadrant blanking means, responsive to said mirror memory means and to said vector line generator means, for providing a final video output signal for displaying a sweep line in only one quadrant of said display matrix.

4. The radial sweep generator circuit of claim 1 in which said vector line generator means comprises:

counter means, presettable to a plurality of counts, for providing a video display pulse upon receipt of a predetermined number of clock pulses, and means for selecting the predetermined count to which said counter means is set in response to said vector number signal from said vector number generator means.

5. The radial sweep generator circuit of claim 1 in which the matrix of display positions is repetitively scanned in synchronism with vertical interval pulses and in which said vector number generator means comprises vector number counter means, responsive to said vertical intervals pulses, for providing successive vector number signals, each associated with a respective one of said series of radial sweep lines.

* * * * *

UNITED STATES PATENT AND TRADEMARK OFFICE
CERTIFICATE OF CORRECTION

PATENT NO. : 4,219,763
DATED : August 26, 1980
INVENTOR(S) : James Dalke

It is certified that error appears in the above-identified patent and that said Letters Patent are hereby corrected as shown below:

Col. 7, line 51, "positions" (first occurrence) should be --position--.
Col. 9, line 10, "ractangular" should be --rectangular--.
Col. 10, line 1, "throught" should be --through--.

Signed and Sealed this

Twenty-fourth Day of February 1981

[SEAL]

Attest:

RENE D. TEGTMEYER

Attesting Officer   Acting Commissioner of Patents and Trademarks